US011461744B2

(12) United States Patent
Kaidi

(10) Patent No.: US 11,461,744 B2
(45) Date of Patent: Oct. 4, 2022

(54) INTRODUCING VARIANCE TO ONLINE SYSTEM ACCESS PROCEDURES

(71) Applicant: PayPal, Inc., San Jose, CA (US)

(72) Inventor: George Chen Kaidi, Singapore (SG)

(73) Assignee: PayPal, Inc., San Jose, CA (US)

( * ) Notice: Subject to any disclaimer, the term of this patent is extended or adjusted under 35 U.S.C. 154(b) by 265 days.

(21) Appl. No.: 16/707,657

(22) Filed: Dec. 9, 2019

(65) Prior Publication Data

US 2021/0174318 A1 Jun. 10, 2021

(51) Int. Cl.
*H04L 9/40* (2022.01)
*G06Q 20/06* (2012.01)

(52) U.S. Cl.
CPC ..... *G06Q 20/0655* (2013.01); *H04L 63/0236* (2013.01); *H04L 63/101* (2013.01)

(58) Field of Classification Search
CPC .......................... G06Q 20/0655; H04L 63/101
See application file for complete search history.

(56) References Cited

U.S. PATENT DOCUMENTS

2002/0120853 A1\* 8/2002 Tyree ................. H04L 63/1458
713/188
2011/0214182 A1\* 9/2011 Adams ..................... G06F 21/00
726/23
2013/0254875 A1\* 9/2013 Sama ....................... G06F 21/31
726/19

FOREIGN PATENT DOCUMENTS

CN 102004869 A \* 4/2011 ............... G06F 7/02

\* cited by examiner

*Primary Examiner* — Edward Chang
(74) *Attorney, Agent, or Firm* — Kowert, Hood, Munyon, Rankin & Goetzel, P.C.; Gareth M. Sampson; Dean M. Munyon

(57) ABSTRACT

Techniques are disclosed relating to determining characteristics associated with attempts to request access an online system. A security test that changes one or more parameters associated with accessing the online system may be implemented for a determined time interval. The parameters changed may include user interface parameters, security threshold parameters, and addresses of servlets in the online system. Access requests received during the security test may be compared to access requests received before and after the security test to determine characteristics of scripted access requests (e.g., automated attacks by one or more malicious users) and legitimate access requests to the online system. The present techniques enhance computer system security and can bolster network bandwidth by allowing malicious access requests to be more easily identified and filtered out.

20 Claims, 13 Drawing Sheets

*FIG. 6*

| Account Creation User Interface 300 | |
|---|---|
| Data Input Field 302A | First Name |
| Data Input Field 302B | Last Name |
| Data Input Field 302C | Address |
| Data Input Field 302D | City |
| Data Input Field 302E | State |
| Data Input Field 302F | Phone Number |

INTRODUCING VARIANCE TO ONLINE SYSTEM ACCESS PROCEDURES

BACKGROUND

Technical Field

This disclosure relates generally to methods of accessing online systems, including transaction systems, and more particularly to introducing variance into how online systems are accessed, including assessing requests that are attempting to access those online systems, according to various embodiments.

Description of the Related Art

Online computer systems are ubiquitous today, providing various different types of services. Access to security systems, files, accounts, the ability to perform financial transactions, and other functionality may be provided via a web interface, for example. Online systems that provide such functionality, including transaction processing systems, may unfortunately be subject to malicious attempts to breach the security of user accounts and access confidential user information and other resources for which the malicious actor is not authorized. These malicious access attempts can take a variety of forms, including automated script attacks. Applicant recognizes that computer system security can be improved by being able to better recognize and handle malicious access requests, and being able to identify the devices that are making these malicious access requests.

BRIEF DESCRIPTION OF THE DRAWINGS

FIG. 6 depicts a representation of an example an account creation user interface, according to some embodiments.

Figure 1:
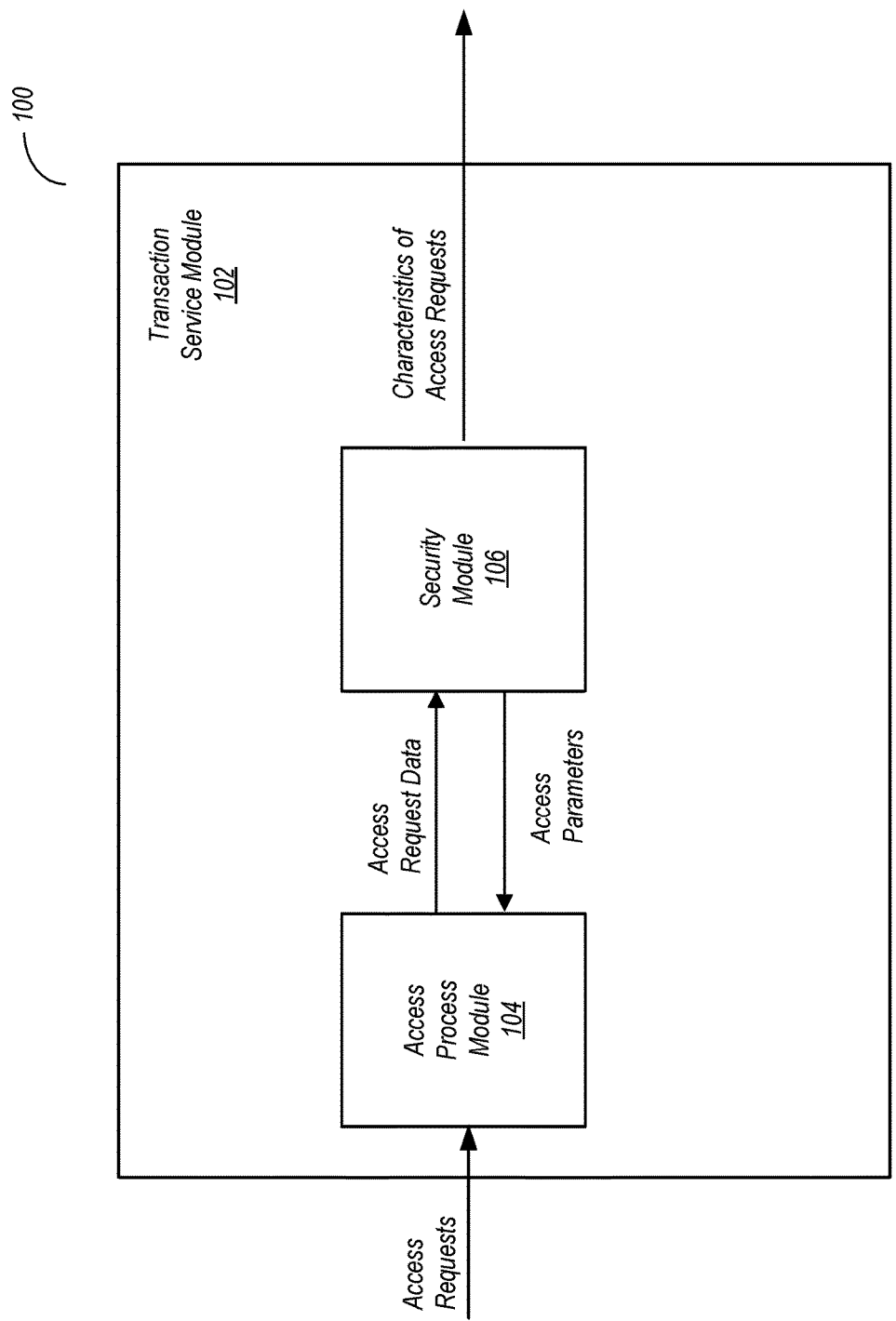
FIG. 1 is a block diagram of a transaction system configured to initiate a security test on an access process to determine the characteristics of access requests received by the system, according to some embodiments.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Reciting in the appended claims that an element is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z). In some situations, the context of use of the term "or" may show that it is being used in an exclusive sense, e.g., where "select one of x, y, or z" means that only one of x, y, and z are selected in that example.

In the following description, numerous specific details are set forth to provide a thorough understanding of the disclosed embodiments. One having ordinary skill in the art, however, should recognize that aspects of disclosed embodiments might be practiced without these specific details. In some instances, well-known, structures, computer program instructions, and techniques have not been shown in detail to avoid obscuring the disclosed embodiments.

DETAILED DESCRIPTION

The present disclosure is directed to various techniques related to the evaluation of attempts to access online systems, including user accounts associated with transaction systems. Online systems (e.g., payment processing systems, social network systems, etc.), may frequently have scripted requests directed at webpages associated with access to resources and functionality provided by those online systems, including access to user accounts on a transaction system. Scripted requests may be, for example, automated access requests that attempt to obtain unauthorized access to a transaction system such as a payment service. Scripted requests may include access requests directed at pages such as user login access pages (e.g., login endpoints) or user account creation pages. Scripted requests can more broadly include any automated request made to a webpage or other online resource, in various embodiments. For user login access pages, scripted requests may be used to attempt to get unauthorized access to a user account in order to obtain confidential information about the user such as credit card information, bank account information, or other user-specific information. For user account creation pages, scripted requests may be used to create fake or impostor user accounts, which can be used for fraudulent purposes such as impersonation of other users.

Online systems, including transaction systems, may be subject to high volumes of scripted requests. Scripted requests may be especially abusive for transaction systems that handle financial information for users such as payment processing systems. In many instances, scripted requests may camouflage themselves as legitimate web requests or calls. For example, scripted requests may be distributed from different IP (Internet Protocol) addresses and may be made slowly and at relatively low volumes. Camouflaging of the scripted requests may inhibit the scripted requests from being caught by security protocols or other protection techniques implemented by online systems.

Identifying scripted requests and the source(s) of scripted requests may be useful in helping prevent attacks on the transaction systems. For example, additional security measures may be put in place on a transaction system after identifying scripted requests and the source(s) of the scripted requests. The additional security measures may be put in place to reduce or limit malicious attacks on the transaction system. Additional security measures may include placing source(s) of the scripted requests on a watchlist such as a greylist or blacklist, limiting access for source(s) of the scripted requests, or lowering access priority for source(s) of the scripted requests.

In many cases, responses to scripted requests are manual in nature. Manual methods, however, can be time consuming and unreliable. The present disclosure contemplates various techniques for identifying scripted requests and the source(s) of scripted requests with improved accuracy while providing minimal disruption to legitimate user access requests.

One embodiment described herein has two broad components: 1) initiating a security test for a determined time interval where the security test includes changing at least one parameter of an access process for a transaction system, and 2) determining characteristics of access requests received during the security test relative to access requests received when the security test was not in place, such as before or after the security test, or both. In embodiments described herein, a security test may be initiated that includes changing user interface parameters, changing thresholds associated with implementing a security procedure for the access process, or changing a network address of where data is sent during the access process. In various embodiments, the changes to the access process made during the security test are done on a temporary basis (e.g., a determined time interval). The changes may be temporary (e.g., on the order of a few minutes) to limit any effects felt by legitimate users trying to access the transaction system, and to prevent the source(s) of scripted requests from being able to recognize and adjust to the changes.

In short, the present inventor has recognized the benefits of implementing a security test that makes changes to aspects of an access process of an online system, and then stores data that allows for a comparison of requests during the test against request made outside the test. Changing the access process in various ways—including changes in the user interface, changes in security thresholds used for permitting login, and changes to page addresses—can lead to a change in access characteristics that can be measured and used to improve system security without presenting any inconvenience to legitimate users. For example, changing an access process by providing a different user interface will likely not inhibit a legitimate user from gaining access to the system, but may cause automated (e.g., scripted) attacks to fail at a noticeably higher rate. This approach advantageously allows a system administrator or automated software the ability to discern characteristics of access requests that are likely to be malicious. In many cases, these comparison results may achieve the most useful results when the security test is implemented for a relatively short period of time before the scripted requests can adapt to the changed access process.

FIG. 1 is a block diagram of a transaction system configured to initiate a security test on an access process to determine the characteristics of access requests received by the system, according to some embodiments. As used herein, the term "transaction system" refers to any computer system that implements a service in which two or more parties use computer systems to exchange information. Accordingly, a "transaction service" according to this disclosure may include a payment service (e.g., PAYPAL), a social network, a file transfer service, an online retailer, a dating site, and so on. Note that generally, this disclosure may include various examples and discussion of techniques and structures within the context of a "transaction system." Note that all these examples, techniques, and structures are generally applicable to any online system that allows access requests. For example, transaction system 100 may be any online system in some instances. However, the term transaction system is used for ease of understanding in various portions of this disclosure.

In the embodiment shown in FIG. 1, transaction system 100 includes transaction service module 102. This module, as with other modules described herein, may be implemented as stored executable computer instructions. Transaction service module 102 includes access process module 104 and security module 106. In this embodiment, security module 106 initiates a security test in transaction service module 102 while access requests are received and verified by access process module 104. The security test may be initiated in transaction service module 102 by changing access parameters provided from security module 106 to access process module 104. The security test may be initiated to determine characteristics of the access requests according to various embodiments described herein.

In certain embodiments, the access requests received during the security test are compared to the access requests received at other times (e.g., before and/or after the security test). A comparison of access requests at these different times may be used to determine characteristics of malicious attacks such as scripted requests. The present inventor has recognized that, during the security test, scripted requests are more likely to fail to access the transaction system than either before or after the security test according to various embodiments, while legitimate users are likely to be able to access the transaction system with similar success as before or after the security test. Thus, in some embodiments, failed access requests during the security test are assessed along with access requests from before and after the security test to identify scripted requests. Once identified, information associated with the scripted requests as well as other access requests may also be determined (e.g., IP address source(s) for the access requests, abused account(s) on the transaction system, etc.).

Embodiments disclosed herein may take various actions based on identifying scripted requests and information associated with the scripted requests. For example, as described above, additional security measures may be put in place to inhibit access to the transaction system by the scripted requests and the scripted request source(s). In some embodiments, additional security measures include placing source(s) of the scripted requests on a watchlist (e.g., a greylist or blacklist). In some embodiments, additional security measures include applying measures to source(s) of the scripted requests (e.g., IP address source(s) of the scripted requests). For example, the source(s) of the scripted requests may be given limited access to the transaction system or given lower priority for accessing the transaction system. Putting these security measures for the source(s) of the scripted requests in place may reduce the potential for fraud or breaches of account security originating from these source(s).

As shown in the embodiment of FIG. 1, access process module 104 is configured to perform various functions related to an access process on transaction system 100. In certain embodiments, the access process is a process for providing a user interface, receiving access requests via the user interface, and making a decision on the access requests. In some embodiments, access requests are made to access a user account associated with transaction system 100 through a user account login interface, as described herein. In such embodiments, the access request may be, for example, a user login request. In some embodiments, access requests are made to access a user account creation interface, described herein, associated with transaction system 100. The user account creation interface may be used to create a new user account associated with transaction system 100. Access requests may also be made via access process module 104 without reference to a specific user account according to various embodiments.

In certain embodiments, access process module 104 receives access requests via a wide-area network such as the Internet. Access requests may, however, be received via any computer system or computer network coupled to access process module 104.

Figure 2:
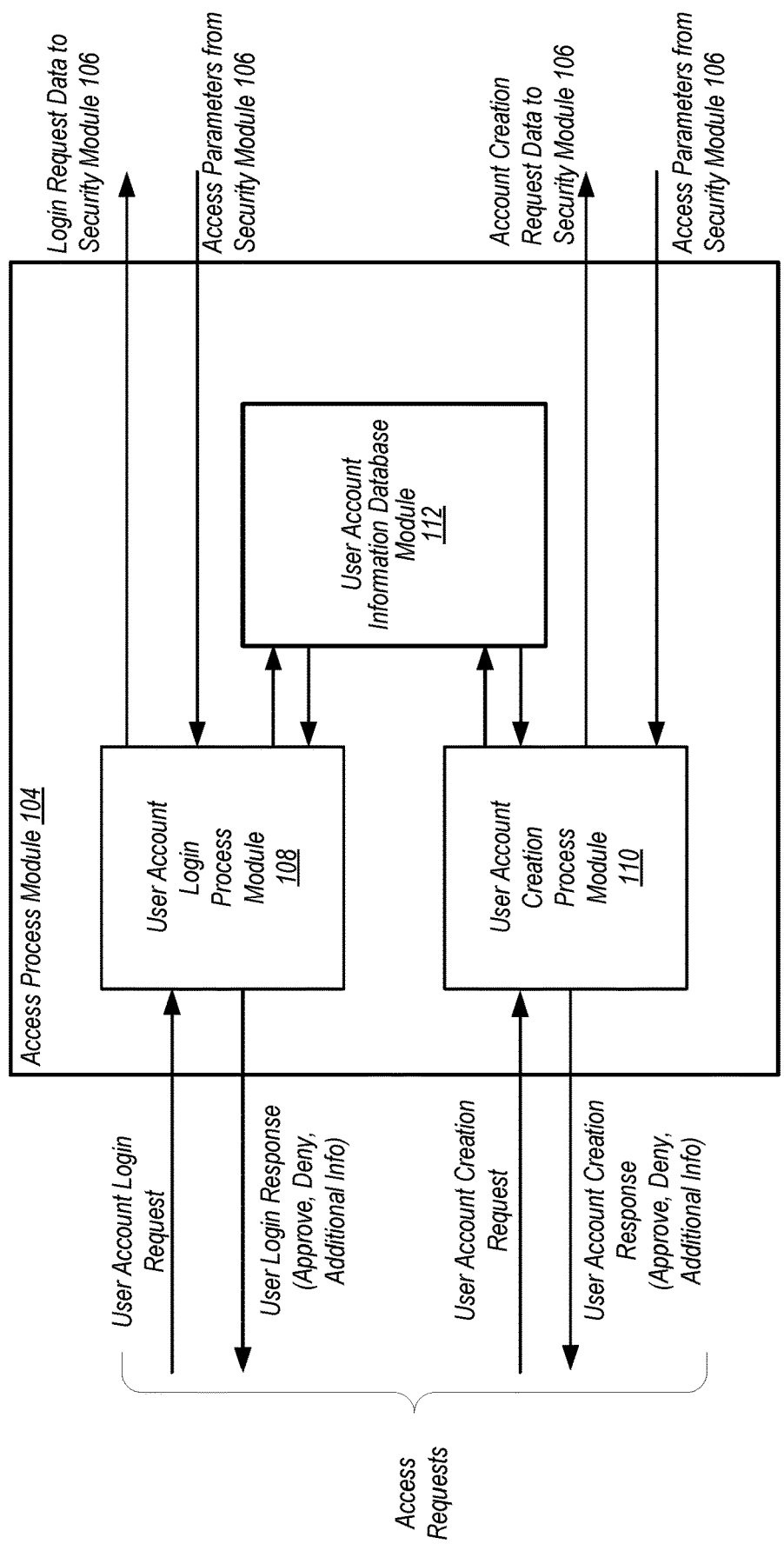
FIG. 2 depicts a block diagram of an access process module, according to some embodiments.

FIG. 2 depicts a block diagram of access process module 104, according to some embodiments. Access process module 104 may include user account login process module 108 and user account creation process module 110. Both user account login process module 108 and user account creation process module 110 may access user account information database module 112. User account information database module 112 may store information pertaining to user accounts on transaction system 100 (e.g., user login information, user profile information, user banking information, user transaction history, etc.).

As described herein, access requests may include a user account login request or a user account creation request, in addition to other access requests that may be to access particular resources or functionality without reference to a specific user account. In certain embodiments, as shown in FIG. 2, user account login requests are received by user account login process module 108, shown in FIG. 3, and user account creation requests are received by user account creation process module 110, shown in FIG. 5. User account login process module 108 may operate a login request process and provide a response to approve or deny the login request to the source of the user account login request. In some embodiments, user account login process module 108 may request additional information from the source of the user account login request. User account login process module 108 may output login request data for both approved and denied login requests from access process module 104. The login request data may be output to, for example, security module 106, as shown in FIG. 1. User account login process module 108 may also receive access parameters from security module 106, as described herein.

User account creation process module 110 may implement an account creation request process and provide a response to approve or deny the request to create an account to the source of the user account creation request. In some embodiments, user account creation process module 110 may request additional information from the source of the user account creation request. User account creation process module 110 may output account creation request data for both approved and denied account creation requests from access process module 104. The account creation request data may be output to, for example, security module 106, as shown in FIG. 1. User account creation process module 110 may also receive access parameters from security module 106, as described herein.

Figure 3:
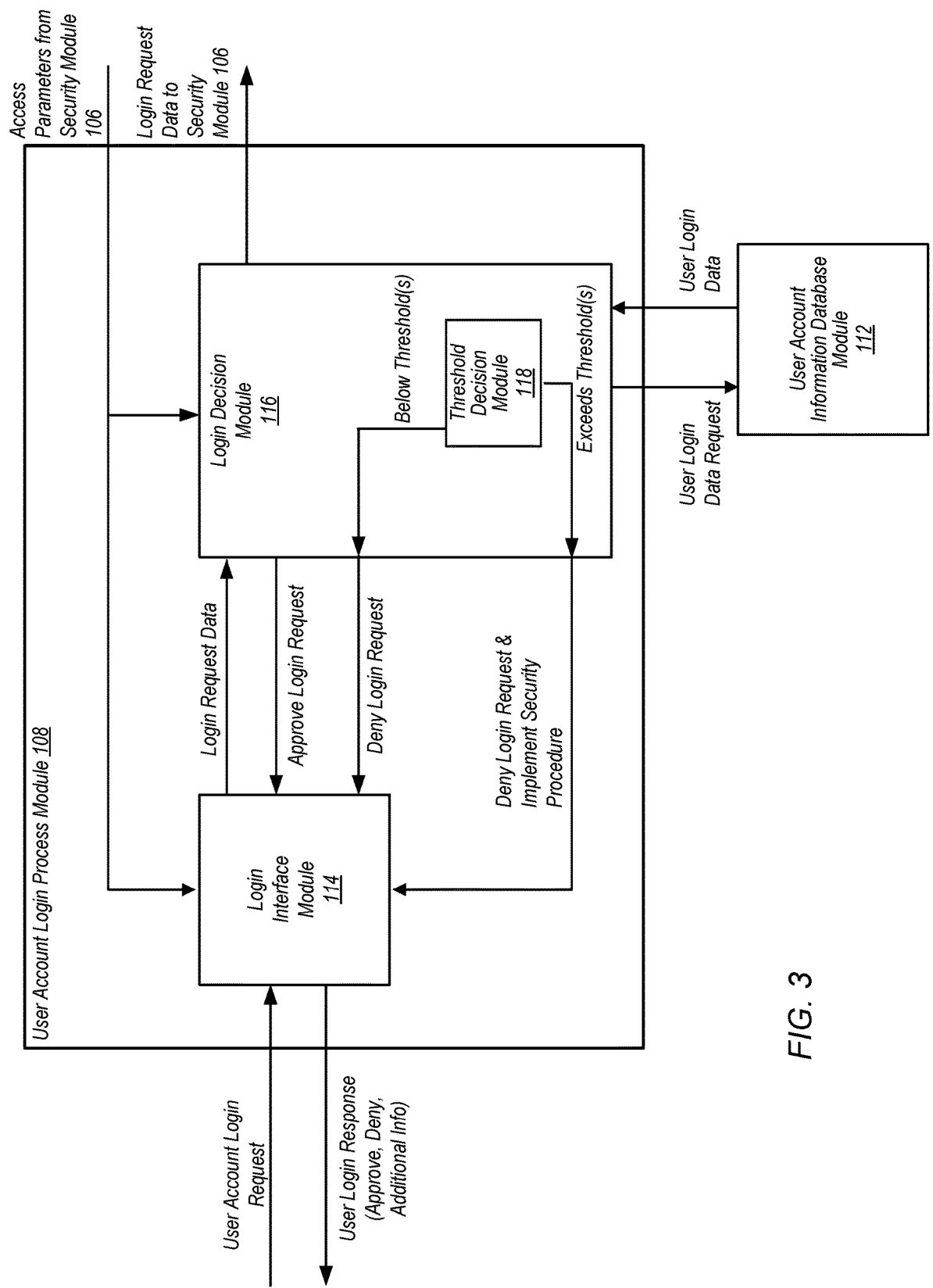
FIG. 3 depicts a block diagram of a user account login process module, according to some embodiments.

FIG. 3 depicts a block diagram of user account login process module 108, according to some embodiments. User account login process module 108 may include login interface module 114 and login decision module 116. Login interface module 114 may generate a login user interface for login requests to transaction system 100.

Figure 4:
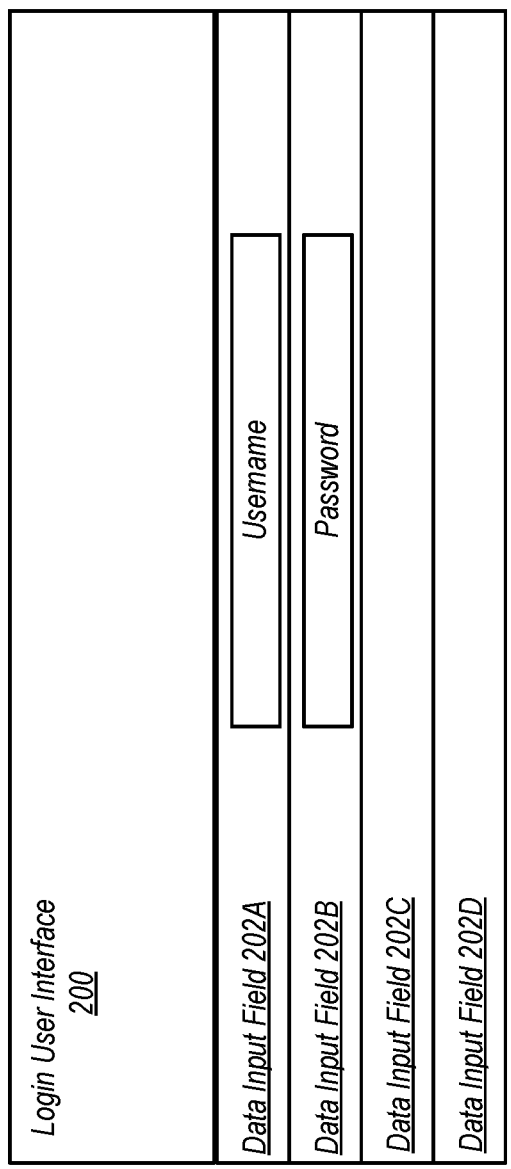
FIG. 4 depicts a representation of an example a login user interface, according to some embodiments.

FIG. 4 depicts a representation of an example a login user interface, according to some embodiments. Login user interface 200 may be accessed by a user attempting a login request to transaction system 100. In certain embodiments, login user interface 200 is accessed by the user via a web browser. For example, a user may use a web browser on a remote computer system (remote from transaction system 100) to access login user interface 200, which is displayed in the web browser. The user may then attempt to login to transaction system 100 using login user interface 200 displayed in the web browser. Other embodiments for accessing login user interface 200 may also be contemplated as the disclosure may not be limited to these particular examples.

Login user interface 200 may include one or more data input fields 202 (e.g., data input fields 202A, 202B, 202C, and 202D, otherwise referred to collectively as "202A-D"). In certain embodiments, data input fields 202 are fields requesting inputs of profile information associated with the user requesting login access to transaction system 100. Data input fields 202 may be, for example, form-fillable data input fields or pull-down menu data fields (such as form entry buttons). In some embodiments, data input fields 202 may request login credentials for the user of transaction system 100. For example, as shown in FIG. 4, data input field 202A may request a username for the user and data input field 202B may request a password associated with the username. Other embodiments of requests for data input fields 202 may also be contemplated as the disclosure may not be limited to these particular examples. Examples of other requests for data input fields 202 include, but are not limited to, email address, zip code, phone number, pin code, date of birth, challenge question answers (e.g., answers to specific questions previously asked of the user during account creation), and an input implemented to distinguish a human input from a scripted input (e.g., a security procedure such as a Captcha process). While FIG. 4 depicts a single page for login user interface 200, other embodiments of a login user interface with multiple pages of data input fields may also be contemplated. For example, a two-factor authentication may be implemented for login user interface 200 where a first webpage directs to a second webpage after the data input fields on the first webpage are completed.

Returning to FIG. 3, data provided by the user to data input fields 202 (e.g., login request data) may be sent to login interface module 114 as part of the user account login request. Login interface module 114 may provide the login request data to login decision module 116. In response to receiving the login request data, login decision module 116 may make a request for user login data from user account information database module 112. The user login data request made by login decision module 116 may request user login data that corresponds to the user account associated with the login request made to transaction system 100 (e.g., the requested login data is for the user account attempting to be accessed via the login request).

After login decision module 116 receives the requested user login data, the login decision module may determine whether to approve or deny the login request. In certain embodiments, login decision module 116 approves or denies the login request by comparing the login request data to the user login data received from user account information database module 112. Login decision module 116 may approve the login request when the login request data is verified to match the user login data received from user account information database module 112. For example, login decision module 116 may approve the login request when the username and password in the login request data matches the username and password received from user account information database module 112.

When the login request data does not match the user login data received from user account information database module 112, login decision module 116 may deny the login request. In certain embodiments, when the login request is denied in login decision module 116, threshold decision module 118 in the login decision module determines the response provided to login interface module 114 denying the login request. The response provided may be based on whether the login request exceeds one or more thresholds associated with implementing a security procedure for requests in threshold decision module 118. For example, as shown in FIG. 3, if the login request is below the threshold(s), the response provided to login interface module 114 may be that the login request is denied without any additional information or any actions being taken. In such cases, the user may attempt another login request without additional information being required or limitations being placed on the subsequent login request.

If, however, the login request exceeds one or more thresholds in threshold decision module 118, the response provided may include implementing a security procedure. The security procedure may include a request for additional information or an additional action to be taken. Login interface module 114 may implement the security procedure in login user interface 200. A request for additional information may include adding data input fields 202 to login user interface 200 that request new information not asked for in the previous login request. For example, a pin code, answers to challenge questions, or Captcha entry may be asked for in addition to a username and password. Actions that may be taken by login interface module 114 include, but are not limited to, blocking the source of the login request (e.g., blocking the IP address of the source) or implementing a waiting period before an additional login request to the user account is accepted. In some embodiments, the added data input fields may be included on a second page (e.g., webpage) in login user interface 200. In some embodiments, the second page is implemented after data entered in the data input fields on the first page are verified by login decision module 116.

One non-limiting example of a threshold that may be implemented in threshold decision module 118 is a threshold on a number of unsuccessful attempts to login into a specific user account. Once such a threshold is exceeded, threshold decision module 118 may provide a response that requests additional information from the user via data input fields 202 on login user interface 200. Another non-limiting example of a threshold that may be implemented in threshold decision module 118 is a threshold on a number of unsuccessful attempts to login from a single source (e.g., a single IP address or a group of IP addresses associated with a single entity). Above this threshold, threshold decision module 118 may implement an action to block the source or request specific information to allow resumption of login requests from the source. The specific information requested may be, for example, a challenge for the source to prove that the source is providing human input and not scripted input (e.g., a Captcha process).

In some embodiments, threshold decision module 118 may implement a threshold on login requests regardless of whether the login requests are successful or unsuccessful. For example, threshold decision module 118 may implement a threshold on a total number of user accounts that have had login requests from a single source in a specified amount of time where the total number of login requests includes both successful and unsuccessful login requests. Above this threshold, threshold decision module 118 may provide a response that denies the login request, even if the login request would otherwise be successful, and implements an action to block the source or request specific information to allow resumption of login requests from the source.

As shown in FIG. 3, login decision module 116 may output login request data from user account login process module 108. The output may be provided to security module 106, as shown in FIGS. 1 and 2. The login request data output from login decision module 116 may include data for both successful (approved) login requests and unsuccessful (denied) login requests. The login request data may be assessed by security module 106, as described herein, to determine characteristics of the login request data. In various other embodiments, other access attempt information such as source IP address, machine information (e.g. desktop, laptop, smartphone type, etc.) (whether or not associated with a particular user account) may also be provided to security module 106 for purposes of determining characteristics of the access request attempts.

Figure 5:
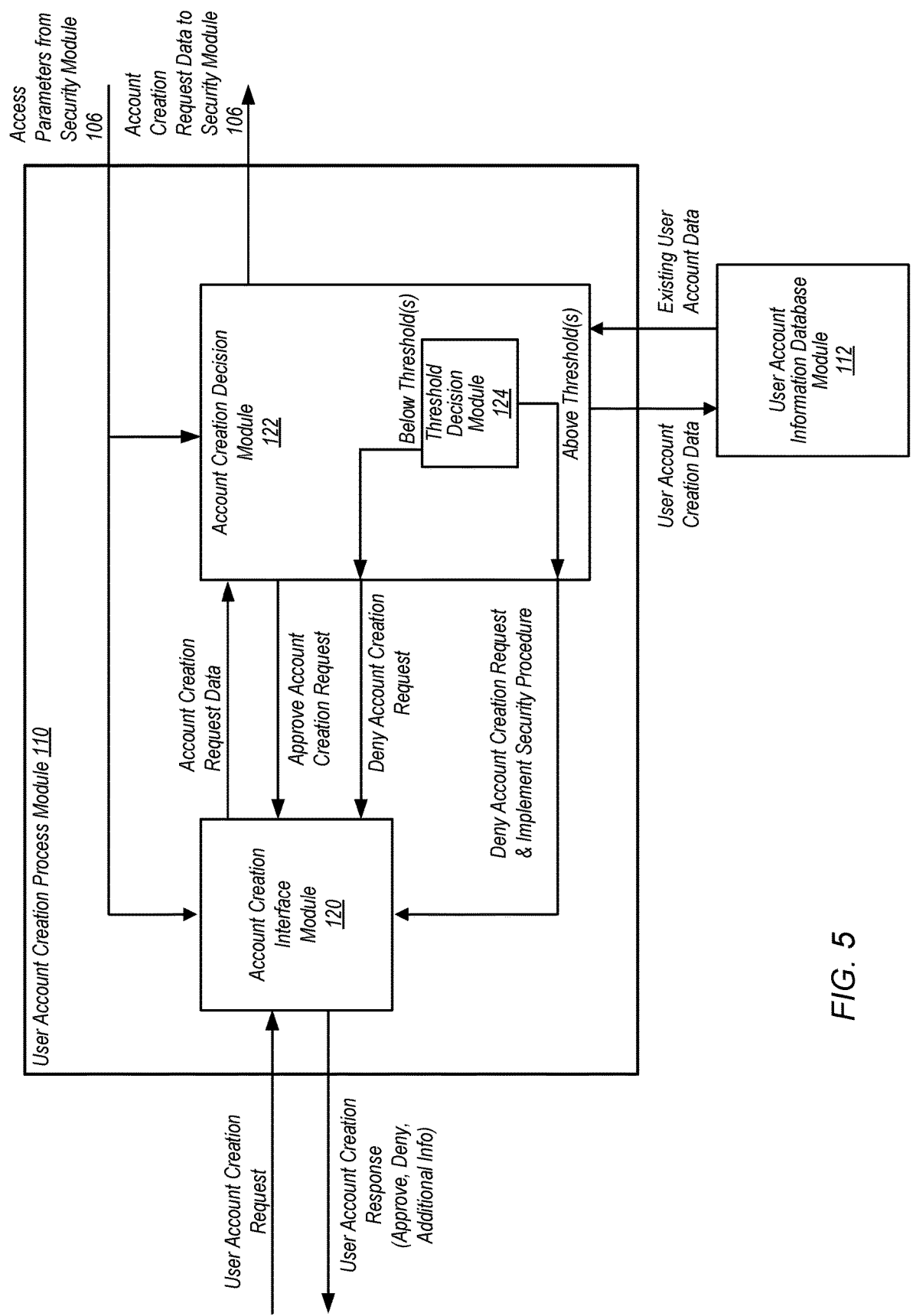
FIG. 5 depicts a block diagram of a user account creation process module, according to some embodiments.

FIG. 5 depicts a block diagram of user account creation process module 110, according to some embodiments. User account creation process module 110 may include account creation interface module 120 and account creation decision module 122. Account creation interface module 120 may generate an account creation user interface for account creation requests to transaction system 100.

FIG. 6 depicts a representation of an example an account creation user interface, according to some embodiments. Account creation user interface 300 may be accessed by a user attempting create a user account on transaction system 100. In certain embodiments, account creation user interface 300 is accessed by the user via a web browser. For example, a user may use a web browser on a remote computer system (remote from transaction system 100) to access account creation user interface 300, which is displayed in the web browser. The user may then use account creation user interface 300, as displayed in the web browser, to enter information to create an account on transaction system 100. Other embodiments for accessing account creation user interface 300 may also be contemplated as the disclosure may not be limited to these particular examples.

Account creation user interface 300 may include one or more data input fields 302 (e.g., data input fields 302A, 302B, 302C, 302D, 302E, 302F, otherwise referred to collectively as "302A-F"). In certain embodiments, data input fields 302 are fields requesting inputs of profile information associated with the user requesting creation of a user account on transaction system 100. Data input fields 302 may be, for example, form-fillable data input fields or pull-down menu data fields. Examples of data input fields 302 include, but are not limited to, first name, last name, address, city, state, phone number, phone type, country, email address, date of birth, username, password, other authentication information, challenge questions selection, challenge question answers, and account-related information (e.g., credit card account information, bank account information, or other account information specific to the user). In some embodiments, at least one data input field may include an input implemented to distinguish a human input from a scripted input (e.g., Captcha input).

Account creation user interface 300 may include any number of pages of data input fields 302 as needed to create a user account on transaction system 100. For example, a first page may include data input fields 302 for user information, such as data input fields 302A-F shown in FIG. 6, while a second page includes data input fields for specific account-related information, such as username and password. Additional pages may include data input fields 302 for other information such as challenge questions selection, challenge question answers, and account-related information requested for transaction system 100. Other embodiments of requests for data input fields 302 may also be contemplated as the disclosure may not be limited to these particular examples.

Returning to FIG. 5, data provided by the user to data input fields 302 (e.g., account creation request data) may be sent to account creation interface module 120 as part of the user account creation request. Account creation interface module 120 may provide the account creation request data to account creation decision module 122. In response to receiving the account creation request data, account creation decision module 122 may access existing user account data to determine whether any of the account creation request data already exists in user account information database module 112. If account creation decision module 122 determines that the none of the account creation request data exists in user account information database module 112, the account creation decision module may provide a response approving the account creation request to account creation interface module 120. Account creation interface module 120 may then provide the response approving the account creation request to the user (e.g., via the web browser or an email). In some embodiments, an additional action may be required to finalize approval of the account creation request. For example, the user may need to provide confirmation via a response to an email or text message, or provide another form of secondary authorization.

If account creation decision module 122 determines that at least some of the account creation request data already exists in user account information database module 112, the account creation decision module may provide a response denying the account creation request to account creation interface module 120. In some embodiments, the response from account creation decision module 122 may include a request for additional information. For example, the response may include a request for additional information that may differentiate the user associated with the account creation request from the user associated with the account already existing in the user account information database module 112.

In some embodiments, when the account creation request is denied by account creation decision module 122, threshold decision module 124 determines the response provided to account creation interface module 120. For example, the response provided may be based on whether the account creation request exceeds one or more thresholds associated with implementing a security procedure for account creation requests in threshold decision module 124. One non-limiting example of a threshold that may be implemented in threshold decision module 124 includes a threshold on a number of unsuccessful attempts to create an account from a single source (e.g., a single IP address or a group of IP addresses associated with a single entity). Another non-limiting example of a threshold that may be implemented in threshold decision module 124 includes a threshold on a number of unsuccessful attempts to create an account using a single piece of data in a data input field (e.g., a number of unsuccessful attempts using a single email address).

Below these threshold(s), the response provided to account creation interface module 120 may be that the account creation request is denied without any security procedure being implemented. In such cases, an additional account creation request may be attempted by the source without additional information being required or limitations being placed on the additional account creation request. Above these threshold(s), threshold decision module 124 may provide a response that implements a security procedure. The security procedure may include an action to block the source or request specific information to allow resumption of account creation requests from the source. Account creation interface module 120 may implement the request for additional information or actions in account creation user interface 300.

In some embodiments, a request for additional information includes adding data input fields 302 to account creation user interface 300 that request additional information for the account creation request. For example, additional information to identify the user may be requested. In some embodiments, the additional information requested may be, for example, a challenge for the source to prove that the source is providing human input and not scripted input. Actions that may be taken by account creation interface module 120 include, but are not limited to, blocking the source of the account creation request (e.g., blocking the IP address of the source) or implementing a waiting period before an additional account creation request is accepted from the source.

In some embodiments, threshold decision module 124 may implement a threshold on account creation requests regardless of whether the account creation requests are successful or unsuccessful. For example, threshold decision module 124 may implement a threshold on a total number of account creation requests from a single source are made in a specified amount of time. Above this threshold, threshold decision module 124 may provide a response that denies the account creation request even when the account creation request would otherwise be successful. Threshold decision module 124 may also implement an action to block the source or request specific information to allow resumption of account creation requests from the source.

As shown in FIG. 5, account creation decision module 122 may output account creation request data from user account creation process module 110. The output may be provided to security module 106, as shown in FIGS. 1 and 2. The account creation request data output from account creation decision module 122 may include data for both successful (approved) account creation requests and unsuccessful (denied) account creation requests. The account creation request data may be assessed by security module 106, as described herein, to determine characteristics of the account creation request data.

Figure 7:
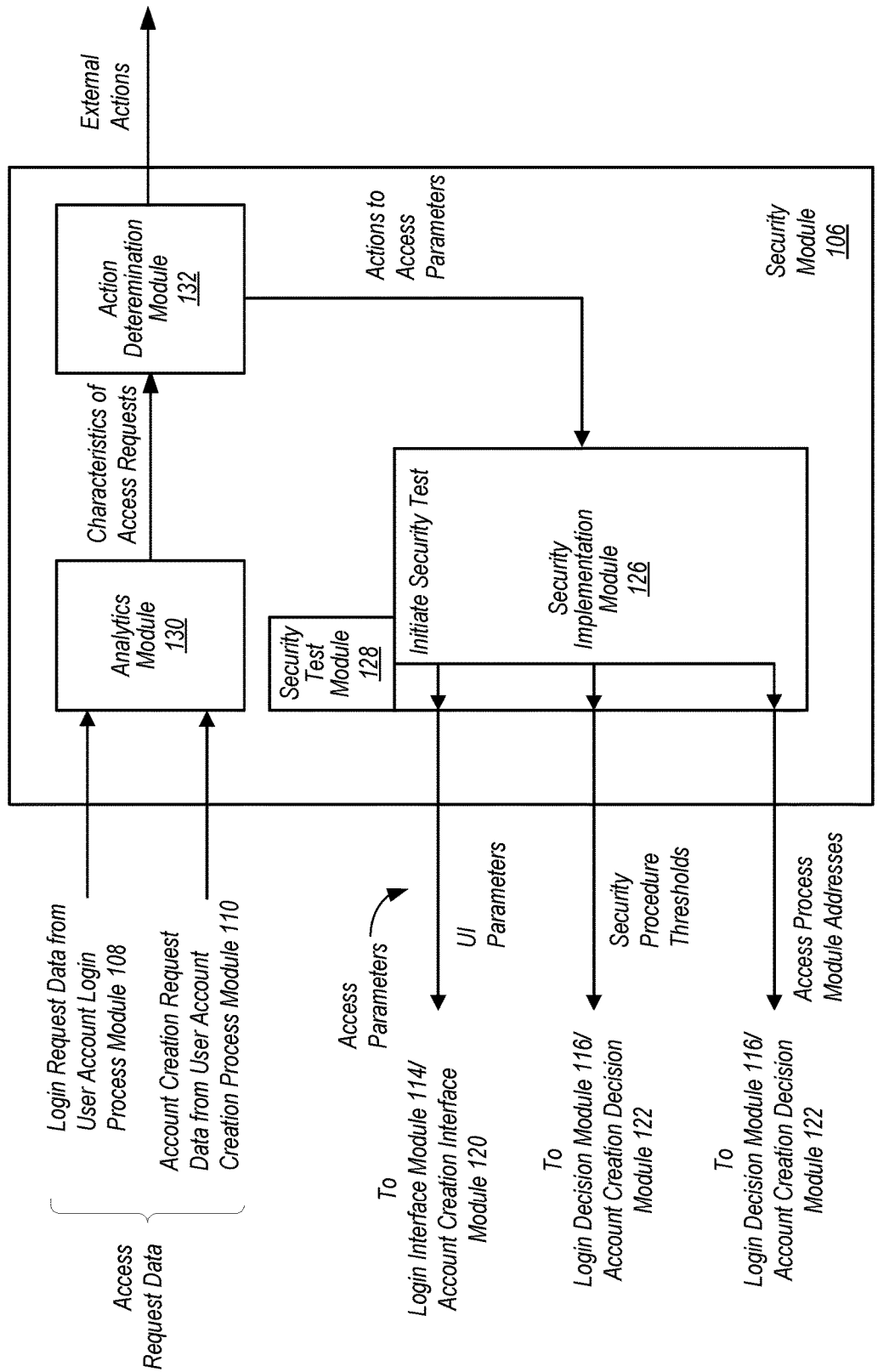
FIG. 7 depicts a block diagram of a security module, according to some embodiments.

FIG. 7 depicts a block diagram of security module 106, according to some embodiments. In certain embodiments, security module 106 includes security implementation module 126, security test module 128, analytics module 130, and action determination module 132. Security test module 128 may be coupled to security implementation module 126 or, in some embodiments, the security test module may be located in the security implementation module. Security implementation module 126 may determine access parameters provided to access process module 104, shown in FIG. 1, for implementation in an access process (e.g., a login request process or account creation request process, described herein). Access parameters determined by security implementation module 126 may include, but not be limited to, parameters associated with a user interface (e.g., parameters for login user interface 200 or account creation user interface 300), thresholds associated with implementing a security procedure (e.g., thresholds in threshold decision module 118 or threshold decision module 124), or addresses for modules in an access process module (e.g., addresses of decision modules in user account login process module 108 or user account creation process module 110).

In certain embodiments, parameters associated with login user interface 200 are provided to login interface module 114. Parameters associated with account creation user interface 300 are provided to account creation interface module 120 in various instances. Examples of parameters for login user interface 200 or account creation user interface 300 include, but are not limited to, locations of data input fields on the user interface, order of data input fields on the user interface, and identifiers for data input fields. Other embodiments of parameters for user interfaces in transaction system 100 may also be contemplated as the disclosure may not be limited to these particular examples.

In certain embodiments, thresholds associated with implementing a security procedure for login requests are provided to login decision module 116. Examples of thresholds that may be provided to login decision module 116 are described above for the embodiment depicted in FIG. 3. Thresholds associated with implementing a security procedure for account creation requests may be provided to account creation decision module 122. Examples of thresholds that may be provided to account creation decision module 122 are described above for the embodiment depicted in FIG. 5. Other embodiments of thresholds for transaction system 100 may also be contemplated as the disclosure is not limited to these particular examples.

An address for a module in an access process module may be, for example, a destination page address for data such as a middleware/servlet endpoint address. In some embodiments, the address is an address for login decision module 116 in user account login process module 108. In some embodiments, the address is an address for account creation decision module 122 in user account creation process module 110. Other embodiments of addresses for modules in transaction system 100 may also be contemplated as the disclosure may not be limited to these particular examples.

During regular operation of transaction system 100, security implementation module 126 provides the determined access parameters to user account login process module 108 or user account creation process module 110. The process modules then operate using the provided parameters as determined by security implementation module 126 until any changes to the parameters are provided by the security implementation module.

In certain embodiments, security test module 128 initiates a security test in security implementation module 126. The security test may be operated for a determined time interval. The determined time interval may be, for example, a temporary time interval specified by security test module 128. In some embodiments, the determined time interval is a specified temporary time interval that is brief compared to regular operation of the access process (e.g., operation of the access process before and after the security test). For example, the determined time interval may be on the order of a few minutes. In some embodiments, the security test is initiated at a random or pseudo-random (e.g., partly random, partly deterministic such as once every 2 to 36 hours but not more than three times in a 24-hour period as one example) point in time. For example, the security test is initiated at random without any predetermined or specified schedule for the security test. Random initiation of the security test may prevent malicious users from predicting a schedule or timing of the security test. In some embodiments, the determined time interval for the security test may also be randomly determined. As used herein, the term "random" includes random or pseudo-random.

In certain embodiments, the security test includes changing, for the determined time interval, one or more of the access parameters provided to user account login process module 108 or user account creation process module 110 from security implementation module 126. Thus, the security test includes a change to an access process in regular operation on transaction system 100. In some embodiments, one access parameter is changed during a security test. Examples of access parameters that may be changed for the security test include, but are not limited to, parameters associated with a user interface, thresholds associated with implementing a security procedure, and addresses for modules in an access process module. Changes in parameters associated with a user interface include, for example, changes in location of data input fields, changes in order of data input fields, or changes in identifiers of data input fields. Changes in thresholds include, for example, changes in the number of attempts permitted before requesting additional information, changes in a challenge used, or changes in the number of attempts before a single request source (e.g., single IP request source) is blocked. Changes in addresses for modules include, for example, changes in an address of a decision module or changes in address of a data endpoint. Additional non-limiting examples of changes to access parameters that may be contemplated are described below in the "Security Test Examples" section of this disclosure.

During the security test, the effect of the change to the access parameter for the determined time interval may not be noticed by a legitimate user attempting to access their authorized account. For example, for changes to the user interface, the user may not notice any differences as the user would provide information as it is requested on their display (e.g., provide data corresponding to the identifiers in requested data fields). For changes to thresholds or addresses for modules, there would be no visual difference for the user to notice. Note that in some embodiments, different changes may occur within a particular determined time interval. For example, one access parameter may be changed to a certain value for one portion of the security test/time interval, and be changed to a different value during another portion of the security test, as one example, and as discussed further below.

The change(s) to the access parameter during the security test may, however, reduce or inhibit scripted requests from successfully accessing transaction system 100 (or any other online system that provides access to resources and/or functionality). As used herein, the term "scripted request" refers to an automated or programmed request that attempts to take over a user account through unauthorized means according to some embodiments, but may include other types of automated or programmed requests to access particular resources and/or functionality in other embodiments. With the change in the access parameter, a scripted request that has a script written for the regular (e.g., pre-security test) operation of the access process may fail because of the change in the access parameter. For example, a change in an identifier of a data input field or a change in the order of data input fields may cause the scripted request to enter the wrong information in the data input field. Thus, the change to the access parameter during the security test may reduce or inhibit successful login attempts using scripted requests or reduce or inhibit successful account creation attempts using scripted requests. As the change to the access parameter is implemented for only the determined time interval of the security test, the source(s) of the scripted request may not notice the change in access parameter before the security test ends and the access parameter reverts to its previous state (e.g., regular operation state of access parameter). Additionally, random initiation of the security test, random time intervals for the security test, or combinations thereof may reduce the likelihood that the scripted request source(s) may detect the changes in the access parameters. Even if the scripted request source(s) detects the changes in the access parameters, randomizing the initiation time and/or interval time, along with a relatively short duration of the security test, may inhibit a malicious user controlling the scripted request source(s) from adapting to any changes.

In some embodiments, the security test may include multiple changes to the access parameter during the security test. For example, the security test may include an AB test where a first change in the access parameter is provided for a first period of time and a second change in the access parameter is provided for a second period of time. In some embodiments, the first period of time and the second period of time are specified for the security test. In some embodiments, the first change in the access parameter is provided for a set number of access requests (e.g., x access requests) and then the second change in the access parameter is provided for the remainder of the security test.

Figure 8:
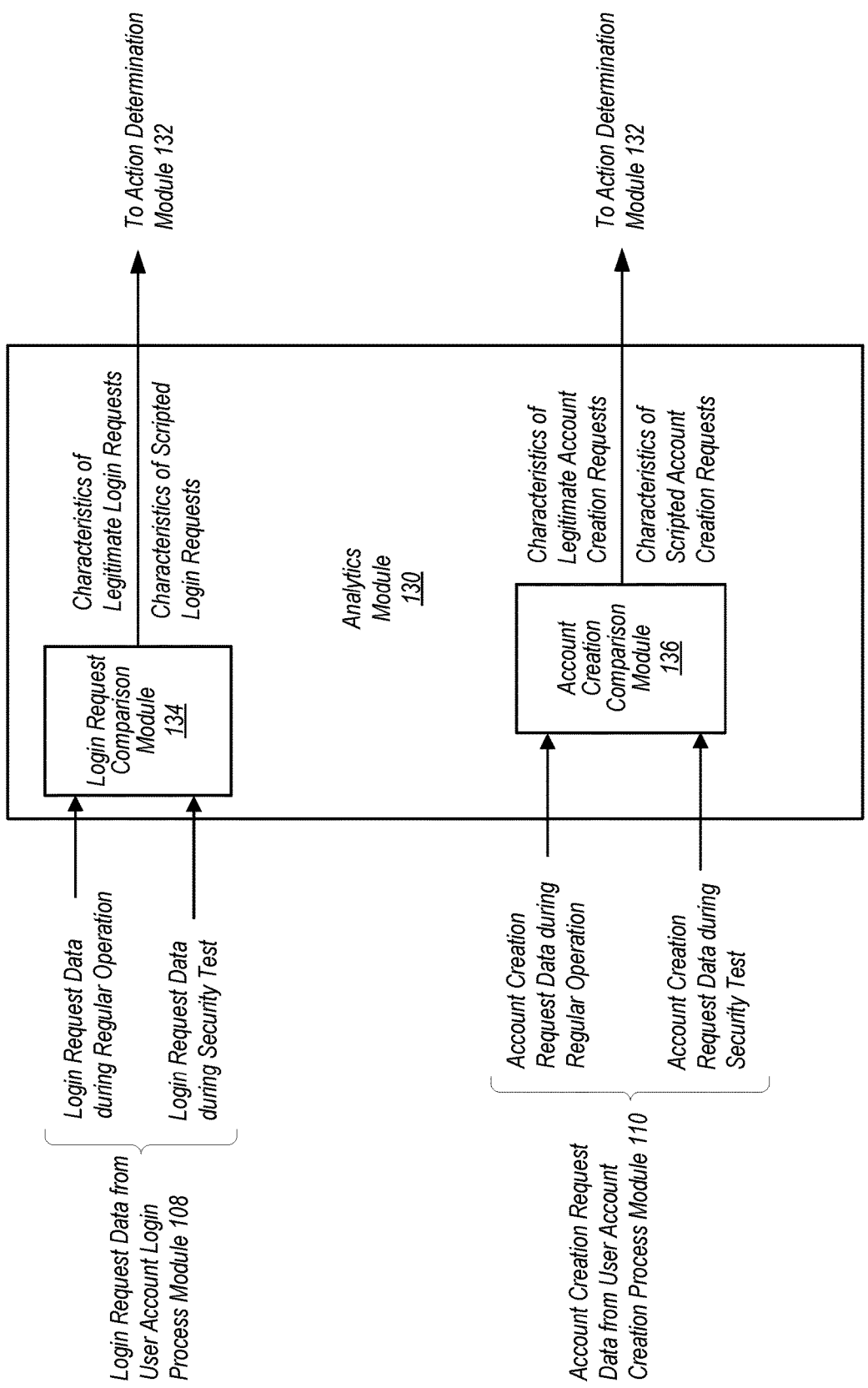
FIG. 8 depicts a block diagram of an analytics module, according to some embodiments.

In certain embodiments, access request data received before and after the security test is assessed relative to access request data received during the security test to determine characteristics of access requests to transaction system 100. As shown in FIG. 7, access request data, including both login request data and account creation request data, may be received in analytics module 130 in security module 106. FIG. 8 depicts a block diagram of analytics module 130, according to some embodiments. Analytics module 130 may include login request comparison module 134 and account creation request comparison module 136.

Login request comparison module 134 may determine characteristics of login requests received during the security test relative to login requests received during regular operation of transaction system 100 (e.g., login requests for a period of time both before and after the security test). Assessing (e.g., comparing) login requests during the security test relative to login requests during regular operation may provide a "fingerprint" of legitimate login requests and scripted login requests to transaction system 100. For example, request source(s) (e.g., IP address(es)) that have increased unsuccessful login requests during the security test may be determined as possible source(s) of scripted requests. As another example, a user account number that has increased unsuccessful login requests during the security test may be determined to be an abused account (e.g., an account that is being maliciously attacked for a specific reason, such as identity information being compromised). Login request source(s) and login request user account(s) that do not have substantial changes in unsuccessful login requests during the security test may be determined to be legitimate source(s) and user account(s).

Account creation request comparison module 136 may determine characteristics of account creation requests received during the security test relative to account creation requests received during regular operation of transaction system 100 (e.g., account creation requests for a period of time both before and after the security test). Assessing (e.g., comparing) account creation requests during the security test relative to account creation requests during regular operation may provide a "fingerprint" of legitimate account creation requests and scripted account creation requests to transaction system 100. For example, request source(s) (e.g., IP address(es)) that have increased unsuccessful account creation requests during the security test may be determined as possible source(s) of scripted account creation requests. As another example, an email address that has increased unsuccessful account creation requests during the security test may be determined to be an abused email address (e.g., an email address associated with a possible scripted request source). Account creation request source(s) and account creation request user account(s) that do not have substantial changes in unsuccessful account creation requests during the security test may be determined to be legitimate source(s) and user account(s).

Login request comparison module 134 and account creation request comparison module 136 may also determine other characteristics of scripted requests received by the modules. Examples of other characteristics include, but are not limited to, entry point(s) of scripted requests, endpoint(s) of scripted requests, geographic location of scripted source(s), name(s) utilized in scripted requests, account number(s) in scripted requests, and other identifying information for the scripted requests. In some embodiments, where the security test includes multiple changes to the access parameter during the security test (e.g., a first change and a second change for an AB test), login request comparison module 134 or account creation request comparison module 136 may access subsets of access requests during the security test for determining characteristics of the access requests where the subsets correspond to each change in the access parameter during the security test.

Figure 9:
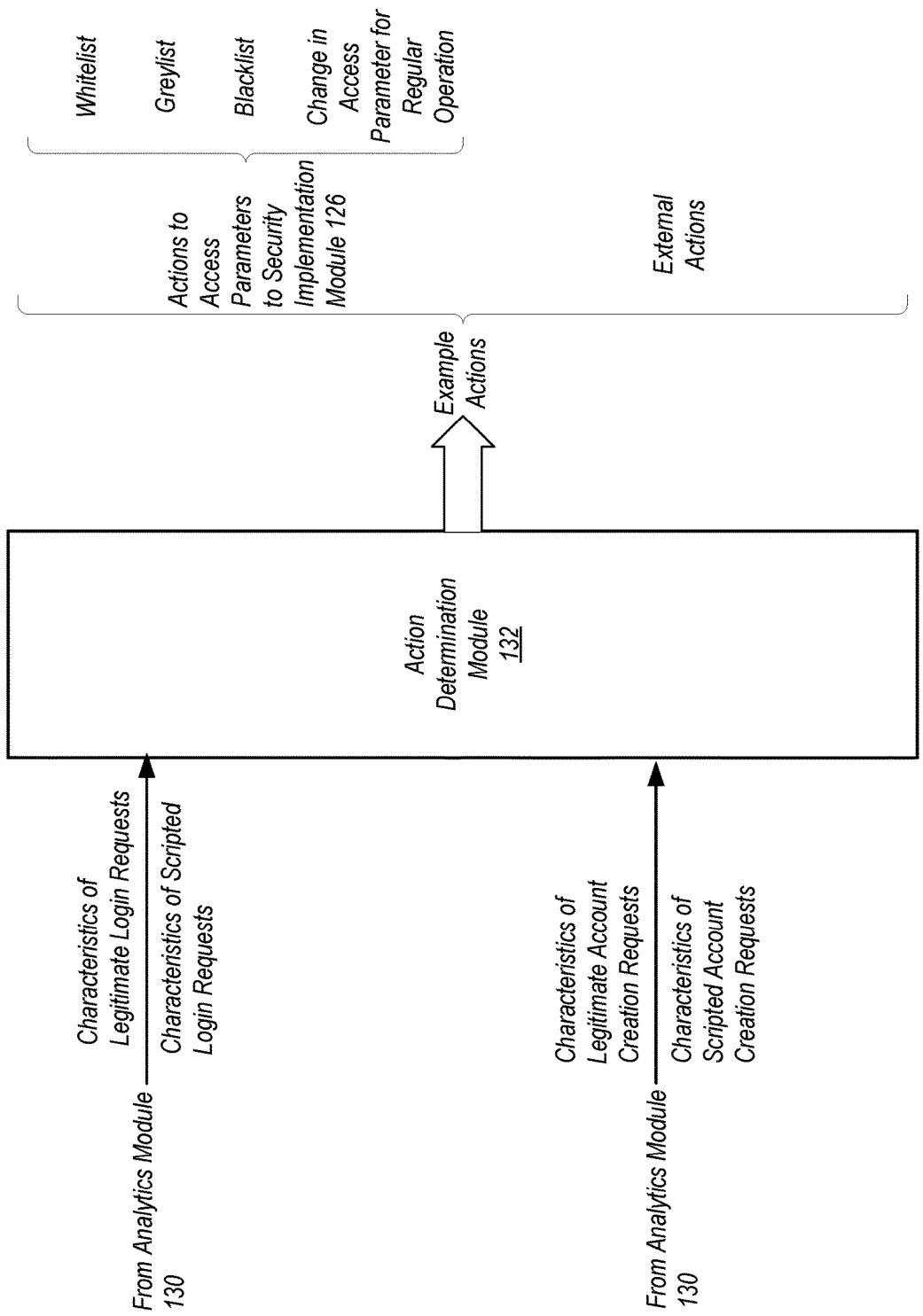
FIG. 9 depicts a block diagram of an action determination module, according to some embodiments.

As shown in FIG. 8, the determined characteristics of login requests and account creation requests may be provided to action determination module 132. FIG. 9 depicts a block diagram of action determination module 132, according to some embodiments. As shown in FIG. 9, action determination module may determine actions based on characteristics of login requests or characteristics of account creation requests received from analytics module 130. Example actions that may be determined by action determination module 132 include actions in categories of actions to access parameters and external actions. Actions to access parameters may be provided to security implementation module 126. External actions may include actions that are to be taken by entities external to security module 106 (also possibly external to transaction system 100).

Examples of actions to access parameters include placing source(s) of access requests (e.g., scripted login requests or scripted account creation requests) on a whitelist, a greylist or a blacklist. A whitelist may include source(s) that are determined as legitimate access request source(s). A greylist may include source(s) that are determined as possible scripted access request source(s) but include potentially legitimate source(s). Thus, source(s) on the greylist may have restrictions placed on access by the source(s) and access requests from the source(s) may be monitored for increased scrutiny by transaction system 100. Restrictions placed on greylist source(s) may include, for example, limiting access to transaction system 100 (e.g., limiting the number of accesses allowed over a specified time period or limiting transaction capability on the transaction system). Another restriction that may be placed on greylist source(s) includes lower access priority to transaction system 100 for these source(s) (e.g., these source(s) may have lower priority for transactions on the transaction system, resulting in slower processing time for requests). Yet another restriction may be lowering threshold(s) for implementing a security procedure on source(s) on the greylist (e.g., reducing the number of attempts needed before implementing a Captcha process or blocking the IP address of the source).

A blacklist may include source(s) that are determined to be scripted access request source(s). The blacklist may include, for example, access request source(s) that are permanently blocked access to transaction system 100 (or blocked for a defined period of time) as these source(s) are identified as frequent abusers of scripted access requests. In some embodiments, source(s) from the greylist may be moved to the blacklist after monitoring indicates that the source(s) are attempting frequent scripted access requests to transaction system 100. Identification of source(s) placed on a whitelist, a greylist, or a blacklist may be provided to security implementation module 126, which may provide parameters corresponding to the lists to decision modules in transaction system 100 for implementation.

In some embodiments, an action to access parameters includes changing one or more access parameters for regular operation of transaction system 100 (e.g., operation of the transaction system outside the security test). For example, vulnerabilities in an access request process may be determined based on the characteristics of the access requests received from analytics module 130. Changes in one or more access parameters may be determined as a solution to reducing the vulnerabilities in the access request process. Thus, changes in the access parameters may be implemented to improve security in transaction system 100.

External actions determined by action determination module 132 may include, but are not limited to, providing determined characteristics from analytics module 130 to external assessment entities (e.g., an external risk assessment team). Characteristics that may be useful to external assessment entities include, but are not limited to, entry point(s) of scripted requests, endpoint(s) of scripted requests, geographic location of scripted request(s), name(s) utilized in scripted requests, account number(s) in scripted requests, and other identifying information for the scripted requests. External assessment entities may also receive information regarding whitelists, greylists, and blacklists from action determination module 132.

Security Test Examples

A first example of a change to an access parameter includes a change to a threshold for implementation a Captcha process. In this example, the threshold for the number of unsuccessful access request attempts before the Captcha process is implemented is reduced for the security test (e.g., instead of requiring a Captcha completion after five failed attempts, it may be required after two failed attempts). If the scripted requests are scripted based on the threshold for regular operation of the Captcha process, reducing the threshold for the Captcha process may increase the number of unsuccessful access requests during the security test.

A second example of a change to an access parameter includes a change to a threshold for blocking requests from an IP address. In this example, the threshold for the number of unsuccessful access request attempts from a single IP address before the IP address is blocked is reduced for the security test. Similar to the first example, if the scripted requests are scripted based on the threshold for regular operation of the IP blocking process, reducing the threshold for the IP blocking process may increase the number of unsuccessful access requests during the security test.

A third example of a change to an access parameter includes a change in the mode of challenge implemented in a security procedure. In this example, the mode of challenge is a Captcha challenge. The Captcha challenge may be changed during the security test. For example, the Captcha challenge may be changed from an Invisible Captcha for regular operation to a Google ReCaptcha™ during the security test. Thus, any scripted requests directed at the Captcha challenge will be reduced success rates during the security test. Mode of challenge could also include, for example, requiring answering one security question (e.g., "what street did you grow up on?") to answering two security questions and also requiring Captcha completion and/or a two factor authentication completion via a text message to a number associated with an account, or other means).

A fourth example of a change to an access parameter includes a change to an address for a decision module in a process module (e.g., the address for login decision module 116 in user account login process module 108). In this example, the middleware/servlet address (e.g., POST address) of login decision module 116 is changed during the security test. Thus, if scripted requests are directed at the POST address of login decision module 116 during regular operation, the scripted requests will be sent to the wrong address during the security test and the number of scripted requests will decrease. Additionally, information about the origins (e.g., IP addresses) of the scripted requests may be determined based on differences determined between access requests during regular operation and access requests during the security test.

A fifth example of a change to an access parameter includes a change in an identifier on an access request user interface (e.g., login user interface 200). In this example, the identifier (e.g., name or label) used for data input field 202A is changed on login user interface 200. Changing the identifier may cause scripted requests to provide the wrong information and thus, unsuccessful requests will increase during the security test. For example, the name of a data input field could be changed from "USERNAME" to become "USER NAME ENTRY".

A sixth example of a change to an access parameter includes a change in order of data fields on an access request user interface (e.g., login user interface 200). In this example, the order of data input fields 202 is changed on login user interface 200. Changing the order of the data input fields may cause scripted requests to provide the wrong information in one or more data input fields and thus, unsuccessful requests will increase during the security test.

A seventh example of a change to an access parameter includes a change in location of data input fields on an access request user interface (e.g., login user interface 200). In this example, the location of the data input fields on a page could be changed. For example, visual location of data input field 202A may be changed by shifting the data input field on the page (such as shifting the data input field 35 pixels down and 40 pixels to the left). Such a shift in visual location may inhibit visual point-and-click scripts from completing the page.

It is also to be understood that the examples of changes to access parameters provided above may also be combined in various embodiments. For example, in some embodiments, the identifiers (names) of data input fields may be changed in combination with changing the order and/or visual locations of the data input fields. As another example, a change in mode of challenge may be combined with a change in characteristics (identifier, order, location, etc.) of data input fields.

Example Methods

Figure 10:
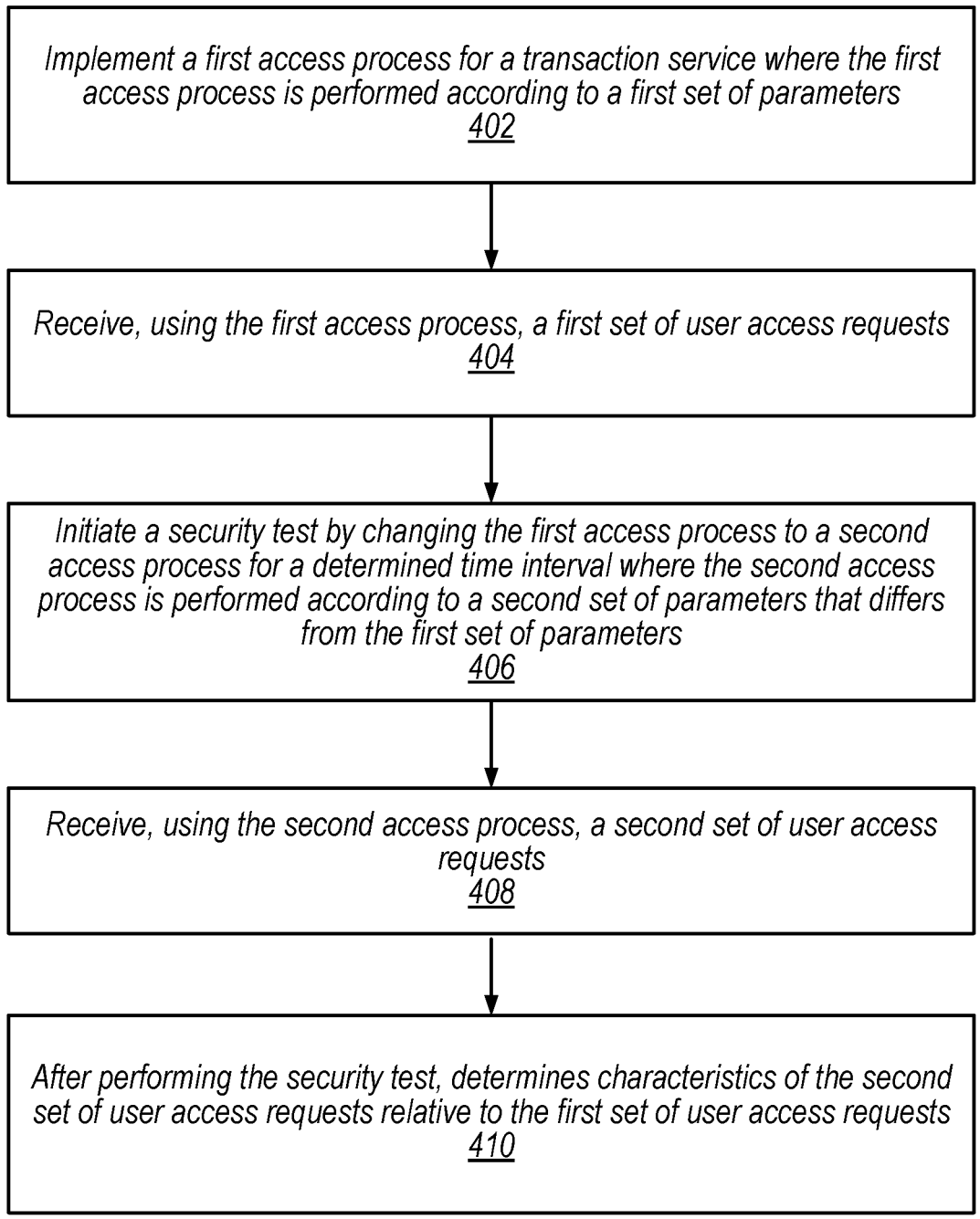
FIG. 10 is a flow diagram illustrating a method for determining characteristics of user access requests to a transaction system based on a security test, according to some embodiments.

FIG. 10 is a flow diagram illustrating a method for determining characteristics of user access requests to a transaction system based on a security test, according to some embodiments. The method shown in FIG. 10 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In various embodiments, some or all elements of this method may be performed by a particular computer system, such as computing device 710, described below.

At 402, in the illustrated embodiment, a computing system implements a first access process for a transaction service where the first access process is performed according to a first set of parameters.

At 404, in the illustrated embodiment, the computing system receives, using the first access process, a first set of user access requests.

At 406, in the illustrated embodiment, the computing system initiates a security test by changing the first access process to a second access process for a determined time interval where the second access process is performed according to a second set of parameters that differs from the first set of parameters. In some embodiments, the security test is initiated at a random point in time during implementation of the first access process by the computer system. In some embodiments, the determined time interval is a specified temporary interval where a time for receiving the second set of user access requests is less than a time for receiving the first set of user access requests. In some embodiments, a difference between the second set of parameters and the first set of parameters includes at least one of: a parameter of a user interface associated with the transaction service, a threshold associated with a security policy for the access process, or a change in an access process module address. Parameters associated with a user interface include, for example, locations of data input fields, order of data input fields, or identifiers of data input fields. Thresholds include, for example, the number of attempts permitted before requesting additional information, a challenge used, or the number of attempts before a single request source (e.g., single IP request source) is blocked. Addresses for access process modules include, for example, addresses of decision modules or addresses of data endpoints.

At 408, in the illustrated embodiment, the computing system receives, using the second access process, a second set of user access requests.

At 410, in the illustrated embodiment, the computing system, after performing the security test, determines characteristics of the second set of user access requests relative to the first set of user access requests. In some embodiments, the computing system determines a white list, a greylist, or a blacklist of users based on the determined characteristics of the second set of user access requests relative to the first set of user access requests. In some embodiments, the computing system determines a set of users having limited access to the transaction service based on the determined characteristics of the second set of user access requests relative to the first set of user access requests. In some embodiments, the computing system determines a set of users having lower priority access to the transaction service based on the determined characteristics of the second set of user access requests relative to the first set of user access requests.

Figure 11:
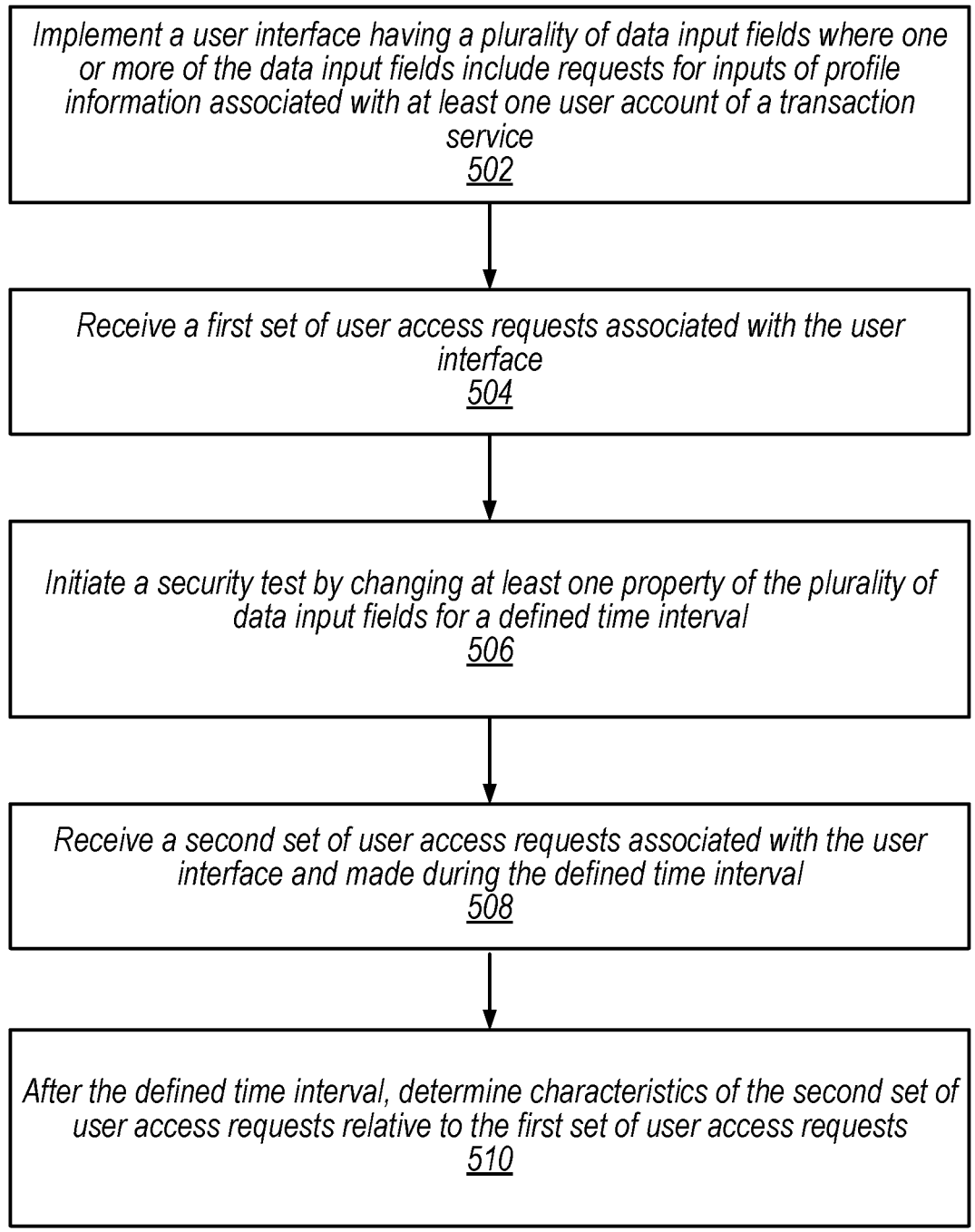
FIG. 11 is a flow diagram illustrating another method for determining characteristics of user access requests to a transaction system based on a security test, according to some embodiments.

FIG. 11 is a flow diagram illustrating another method for determining characteristics of user access requests to a transaction system based on a security test, according to some embodiments. The method shown in FIG. 11 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In various embodiments, some or all elements of this method may be performed by a particular computer system, such as computing device 710, described below.

At 502, in the illustrated embodiment, a computing system implements a user interface having a plurality of data input fields where one or more of the data input fields include requests for inputs of profile information associated with at least one user account of a transaction service. In some embodiments, the user interface includes at least one of a user account creation interface or a user account login interface.

At 504, in the illustrated embodiment, the computing system receives a first set of user access requests associated with the user interface.

At 506, in the illustrated embodiment, the computing system initiates a security test by changing at least one property of the plurality of data input fields for a defined time interval. In some embodiments, the change in the at least one property includes a change in a location of at least one of the data input fields on the user interface. In some embodiments, the change in the at least one property includes a change in an identifier of profile information associated with at least one of the data input fields on the user interface. In some embodiments, the change in the at least one property includes a change in an order on the user interface of at least two of the data input fields.

At 508, in the illustrated embodiment, the computing system receives a second set of user access requests associated with the user interface and made during the defined time interval.

At 510, in the illustrated embodiment, the computing system, after the defined time interval, determines characteristics of the second set of user access requests relative to the first set of user access requests.

Figure 12:
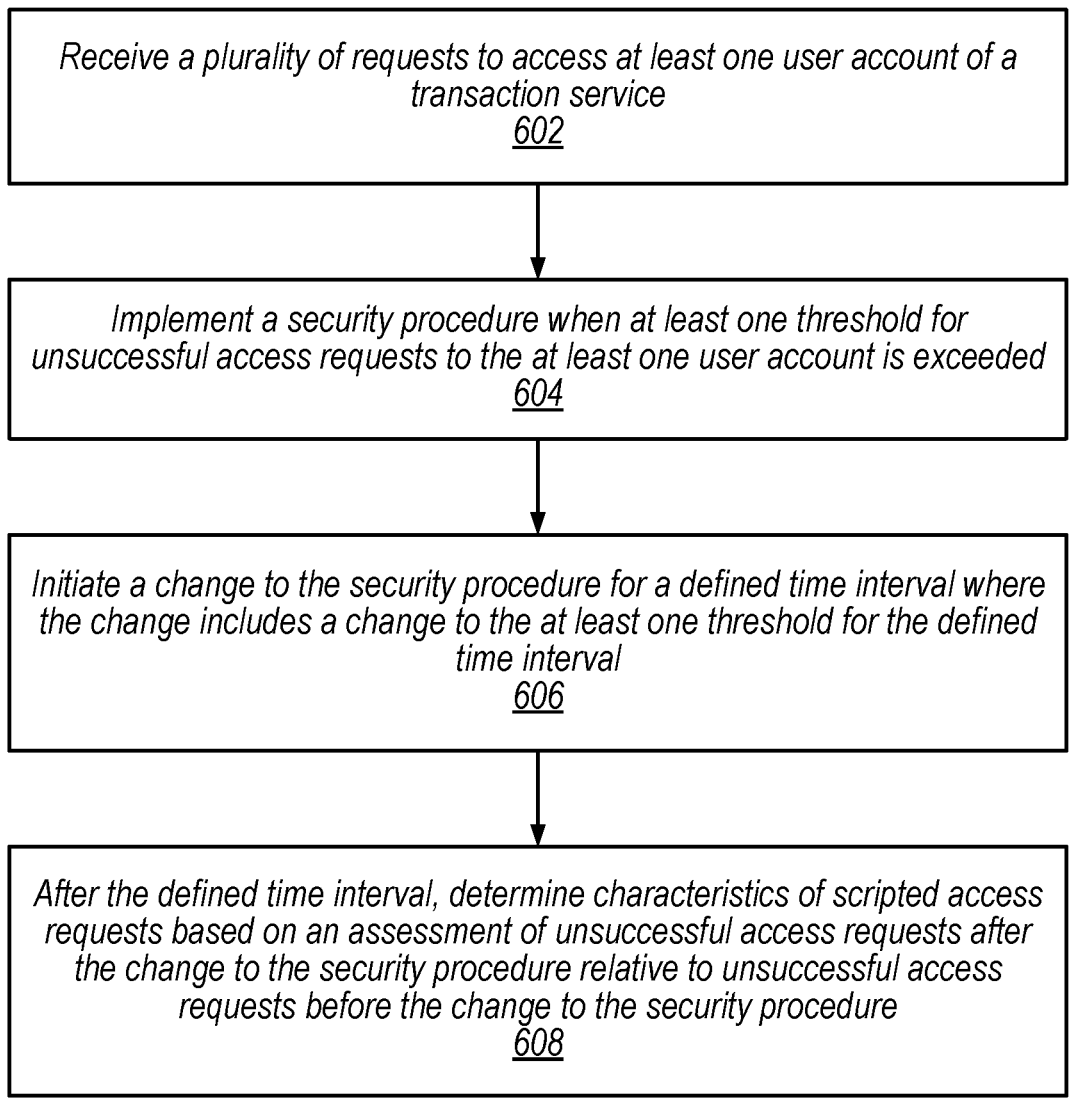
FIG. 12 is a flow diagram illustrating a method for determining characteristics of user access requests to a transaction system based a change in a security procedure, according to some embodiments.

FIG. 12 is a flow diagram illustrating a method for determining characteristics of user access requests to a transaction system based on a change in a security procedure, according to some embodiments. The method shown in FIG. 12 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In various embodiments, some or all elements of this method may be performed by a particular computer system, such as computing device 710.

At 602, in the illustrated embodiment, a computing system receives a plurality of requests to access at least one user account of a transaction service.

At 604, in the illustrated embodiment, the computing system implements a security procedure when at least one threshold for unsuccessful access requests to the at least one user account is exceeded. In some embodiments, the security procedure is a procedure implemented to distinguish a human input request from scripted input. In some embodiments, the at least one threshold is a number of unsuccessful access requests to the at least one user account. In some embodiments, the at least one threshold is a number of unsuccessful access requests from an Internet Protocol address where the security procedure is a procedure implemented to inhibit access requests from the Internet Protocol address.

At 606, in the illustrated embodiment, the computing system initiates a change to the security procedure for a defined time interval where the change includes a change to the at least one threshold for the defined time interval.

At 608, in the illustrated embodiment, the computing system, after the defined time interval, determines characteristics of scripted access requests based on an assessment of unsuccessful access requests after the change to the security procedure relative to unsuccessful access requests before the change to the security procedure.

Example Computer System

Figure 13:
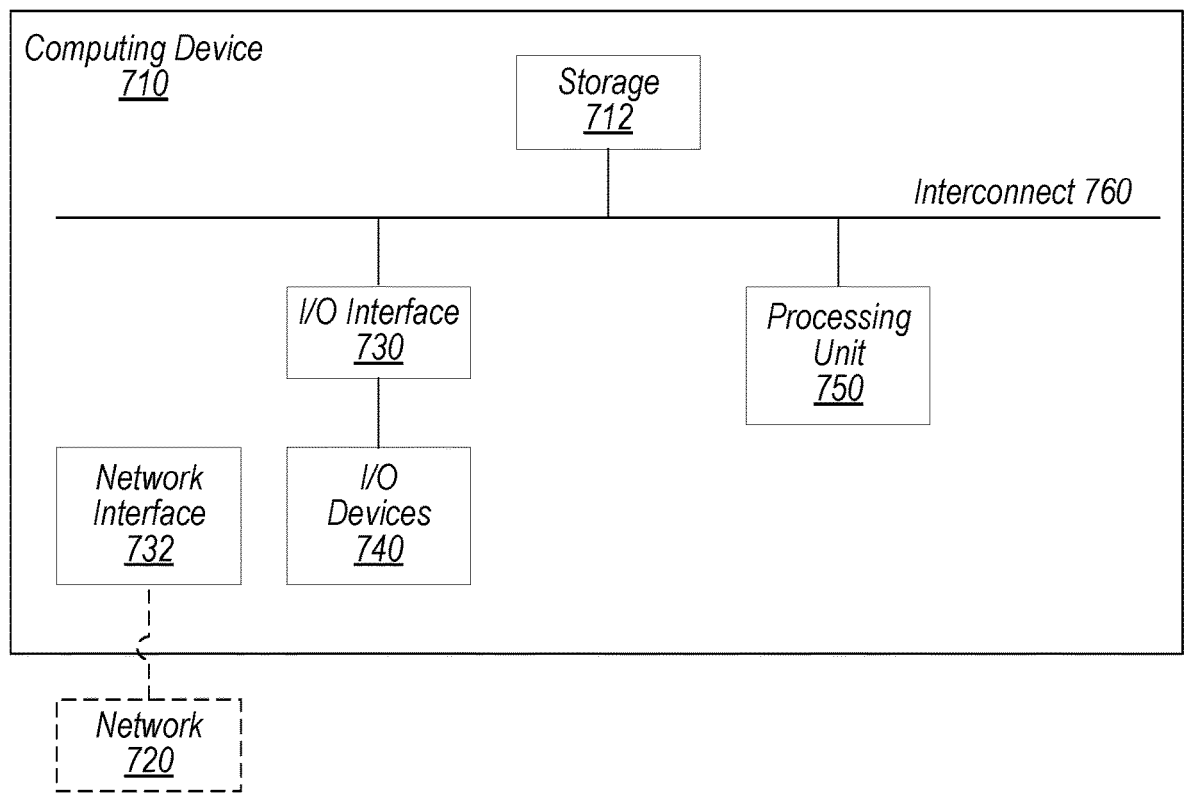
FIG. 13 is a block diagram of one embodiment of a computer system.

Turning now to FIG. 13, a block diagram of one embodiment of computing device (which may also be referred to as a computing system) 710 is depicted. Computing device 710 may be used to implement various portions of this disclosure. Computing device 710 may be any suitable type of device, including, but not limited to, a personal computer system, desktop computer, laptop or notebook computer, mainframe computer system, web server, workstation, or network computer. As shown, computing device 710 includes processing unit 750, storage 712, and input/output (I/O) interface 730 coupled via an interconnect 760 (e.g., a system bus). I/O interface 730 may be coupled to one or more I/O devices 740. Computing device 710 further includes network interface 732, which may be coupled to network 720 for communications with, for example, other computing devices.

In various embodiments, processing unit 750 includes one or more processors. In some embodiments, processing unit 750 includes one or more coprocessor units. In some embodiments, multiple instances of processing unit 750 may be coupled to interconnect 760. Processing unit 750 (or each processor within 750) may contain a cache or other form of on-board memory. In some embodiments, processing unit 750 may be implemented as a general-purpose processing unit, and in other embodiments it may be implemented as a special purpose processing unit (e.g., an ASIC). In general, computing device 710 is not limited to any particular type of processing unit or processor subsystem.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Storage 712 is usable by processing unit 750 (e.g., to store instructions executable by and data used by processing unit 750). Storage 712 may be implemented by any suitable type of physical memory media, including hard disk storage, floppy disk storage, removable disk storage, flash memory, random access memory (RAM—SRAM, EDO RAM, SDRAM, DDR SDRAM, RDRAM, etc.), ROM (PROM, EEPROM, etc.), and so on. Storage 712 may consist solely of volatile memory, in one embodiment. Storage 712 may store program instructions executable by computing device 710 using processing unit 750, including program instructions executable to cause computing device 710 to implement the various techniques disclosed herein.

I/O interface 730 may represent one or more interfaces and may be any of various types of interfaces configured to couple to and communicate with other devices, according to various embodiments. In one embodiment, I/O interface 730 is a bridge chip from a front-side to one or more back-side buses. I/O interface 730 may be coupled to one or more I/O devices 740 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    implementing, by a computer system, an access process for a transaction service, wherein the access process is performed according to access parameters;
    receiving, by the computer system during the access process, a first set of user access requests, wherein the first set of user access requests are processed using a first set of access parameters;
    initiating, by the computer system at a random point in time while the access process is in operation, a security test, wherein initiating the security test includes changing the access parameters for the access process from the first set of access parameters to a second set of access parameters for a determined time interval, wherein the second set of access parameters includes at least one access parameter that is changed from the first set of access parameters;
    receiving, by the computer system during the security test, a second set of user access requests, wherein the second set of user access requests are processed using the second set of access parameters; and
    after the security test has ended, determining, by the computer system, characteristics of the second set of user access requests relative to the first set of user access requests received before the security test.

2. The method of claim 1, further comprising determining at least one source of scripted access requests to the transaction service based on the determined characteristics of the second set of user access requests relative to the first set of user access requests.

3. The method of claim 1, wherein the at least one access parameter in the second set of access parameters that is changed from the first set of access parameters includes at least one of the following access parameters: a parameter of a user interface associated with the transaction service, a threshold associated with implementing a security procedure for the access process, or a change in an access process module address.

4. The method of claim 1, further comprising determining, by the computer system, a whitelist, a greylist, or a blacklist of users based on the determined characteristics of the second set of user access requests relative to the first set of user access requests.

5. The method of claim 1, further comprising determining, by the computer system, a set of users having limited access to the transaction service based on the determined characteristics of the second set of user access requests relative to the first set of user access requests.

6. The method of claim 1, further comprising determining, by the computer system, a set of users having lower priority access to the transaction service based on the determined characteristics of the second set of user access requests relative to the first set of user access requests.

7. The method of claim 1, wherein, after the security test has ended, the access parameters for the access process are changed from the second set of access parameters to the first set of access parameters.

8. The method of claim 7, further comprising:
    receiving, by the computer system for a period of time after the security test has ended, a third set of user access requests, wherein the third set of user access requests are processed using the first set of access parameters; and
    determining, by the computer system after the period of time, characteristics of the second set of user access requests relative to the first set of user access requests received before the security test and the third set of user access requests received after the security test.

9. A method, comprising:
    implementing, at a computer system, a user interface for a user account access process, wherein the user interface has a plurality of data input fields, and wherein one or more of the data input fields comprise requests for inputs of profile information associated with at least one user account of a transaction service;
    receiving, by the computer system during the access process, a first set of user access requests associated with the user interface;
    initiating, by the computer system at a random point in time while the access process is in operation, a security test, wherein initiating the security test includes changing at least one property of the plurality of data input fields in the user interface for a defined time interval;
    receiving, by the computer system during the security test, a second set of user access requests associated with the user interface; and
    after the security test has ended, determining, by the computer system, characteristics of the second set of user access requests relative to the first set of user access requests received before the security test.

10. The method of claim 9, wherein changing the at least one property includes changing a location of at least one of the data input fields on the user interface.

11. The method of claim 9, wherein changing the at least one property includes changing an identifier of profile information associated with at least one of the data input fields on the user interface.

12. The method of claim 9, wherein changing the at least one property includes changing an order on the user interface of at least two of the data input fields.

13. The method of claim 9, wherein changing the at least one property during the security test includes changing the at least one property with a first change in the at least one property for at least one first user during the security test and changing the at least one property with a second change in the at least one property for at least one second user during the security test.

14. The method of claim 13, further comprising:
accessing, by the computer system, a first subset of the second set of user access requests associated with the user interface for the first change in the at least one property; and
accessing, by the computer system, a second subset of the second set of user access requests associated with the user interface for the second change in the at least one property.

15. The method of claim 14, further comprising, after the security test, determining, by the computer system, characteristics of the second subset relative to the first subset.

16. The method of claim 9, wherein the user interface includes at least one of a user account creation interface or a user account login interface.

17. A non-transitory computer-readable medium having instructions stored thereon that are executable by a computing device to perform operations, comprising:
receiving, during an access process, a plurality of requests to access at least one user account of a transaction service;
implementing, during the access process, a security procedure when at least one threshold for unsuccessful access requests to the at least one user account is exceeded;
initiating, at a random point in time while the access process is in operation, a change to the security procedure for a defined time interval, wherein initiating the change to the security procedure includes changing the at least one threshold for unsuccessful access requests to the at least one user account;
receiving, during the defined time interval, a second plurality of requests to access the at least one user account of the transaction service;
implementing, during the defined time interval, the security procedure when the at least one changed threshold for unsuccessful access requests to the at least one user account is exceeded; and
after the defined time interval, determining characteristics of scripted access requests based on an assessment of unsuccessful access requests in the second plurality of requests received during the defined time interval relative to unsuccessful access requests in the plurality of requests received before the defined time interval.

18. The non-transitory computer-readable medium of claim 17, wherein the security procedure is a procedure implemented to distinguish a human input request from scripted input.

19. The non-transitory computer-readable medium of claim 18, wherein the at least one threshold is a number of unsuccessful access requests to the at least one user account.

20. The non-transitory computer-readable medium of claim 17, wherein the at least one threshold is a number of unsuccessful access requests from an Internet Protocol address, and wherein the security procedure is a procedure implemented to inhibit access requests from the Internet Protocol address.

* * * * *